United States Patent [19]

Bourgraf et al.

[11] 4,251,178
[45] Feb. 17, 1981

[54] BUSINESS MACHINE CART WITH TRUNK LOADING ATTACHMENT

[75] Inventors: Elroy E. Bourgraf, Cincinnati; Robert E. Dunn; Kenneth R. Self, both of Washington Ch., all of Ohio

[73] Assignee: Ferno-Washington, Inc., Wilmington, Ohio

[21] Appl. No.: 942,188

[22] Filed: Sep. 14, 1978

[51] Int. Cl.$^3$ .............................................. B65G 67/00
[52] U.S. Cl. ..................... 414/343; 414/540; 414/602
[58] Field of Search ................ 187/12, 17; 254/152; 414/340, 343, 345, 346, 347, 349, 350, 540, 546, 589, 598, 602, 601, 673, 490, 697, 782; 280/47.29, 47.27

[56] References Cited

U.S. PATENT DOCUMENTS

| | | | |
|---|---|---|---|
| 1,041,020 | 10/1912 | Corstens | 187/12 |
| 1,264,878 | 4/1918 | McInnis | 254/152 |
| 1,504,034 | 8/1924 | Erwin | 414/598 |
| 1,558,472 | 10/1925 | Golon | 254/152 |
| 1,589,203 | 6/1926 | Merrifield | 414/598 |
| 2,394,148 | 2/1946 | Campbell | 414/598 |
| 2,710,759 | 6/1955 | Bayer et al. | 280/47.27 |
| 4,009,891 | 3/1977 | Jensen | 280/47.27 |

*Primary Examiner*—Lawrence J. Oresky

[57] ABSTRACT

A cart for use in transporting and demonstrating business machines and the like, the cart comprising a wheel section and a handle section each having spaced apart pairs of track forming frame members along which a carriage for mounting a business machine is adapted to travel from a transport position in which the carriage lies adjacent the lower end of the wheel section to a demonstration position adjacent the upper end of the handle section which is curved to permit the upper end of the handle section to be seated on the top of a desk, the handle section mounting spring assist means in the form of a spiral spring the end of which is operatively connected to the carriage to counterbalance the weight of the business machine as the cart is moved from one position to the other, the cart having a detachable support leg which, in its position of use, converts the cart into a free-standing demonstration stand, a trunk loading attachment also being provided, the attachment comprising a track forming frame extension adapted to be connected to the upper end of the handle section and a base plate adapted to be positioned in the trunk, the base plate mounting an adjustable support which pivotally receives the frame extension, the frame extension being pivotal about the support to deposit the carriage in the trunk, whereupon the frame extension is detached from the remainder of the cart and lowered onto the base plate.

15 Claims, 19 Drawing Figures

4,251,178

BUSINESS MACHINE CART WITH TRUNK LOADING ATTACHMENT

BRIEF SUMMARY OF THE INVENTION

This invention relates to carts intended for use by salespersons to transport and demonstrate various types of business machines which are too heavy or bulky to be carried. While salespersons' carts have hitherto been provided by means of which typewriters, bookkeeping machines, adding machines, calculators, audio-visual equipment, copiers and the like may be rolled from the salesperson's automobile to the office of a prospective purchaser, such carts are of limited utility and usually require substantial effort on the part of the salesperson to lift the equipment to and from the cart both during loading and unloading from an automobile and for demonstration purposes. In addition, the carts are often bulky and cannot be conveniently stored when not in use.

The present invention relates to a highly versatile cart construction composed of a plurality of components which may be easily assembled and disassembled by the salesperson, including an attachment by means of which a business machine or other bulky equipment may be readily and easily loaded and unloaded from the trunk of an automobile. In addition to enabling the salesperson to readily transport the equipment from place to place, the cart also serves as a demonstration stand, the cart being adapted to be supported by a table or desk during a demonstration, or in the alternative it may be supported by its own leg section to provide a free-standing demonstration stand.

In accordance with the invention the basic cart comprises a wheel section, a handle section, and a platform or carriage on which the business machine or the like is secured, the carriage being movable along the wheel and handle sections from a lowermost or transport position in which the carriage is supported by the wheel section in an essentially vertically disposed position to an uppermost or demonstration position in which the carriage is supported in a horizontal position by the handle section.

The wheel and handle sections comprise spaced apart pairs of tubular frame members which define tracks along which the carriage travels, the carriage having sets of rollers which engage opposite sides of the track forming frame members, the sets of rollers serving to maintain the carriage in engagement with tracks while permitting it to travel lengthwise along the tracks.

The handle section is provided with spring assist mechanism which automatically engages the carriage during movement from the demonstration portion to the transport position and return, the spring assist mechanism acting to counterbalance the weight of the loaded carriage so that it may be easily moved from one position to the other.

The wheel section of the cart is provided with a foot member by means of which the cart may be positioned in an essentially upright condition when the carriage is in the transport position. When it is desired to move the cart to another location, the salesperson simply tilts the cart on its wheels to an inclined position and pulls or pushes the cart by means of a handlebar mounted at the uppermost end of the handle section. The handlebar preferably has a flat undersurface covered with rubber or other resilient gripping material, the handlebar being oriented so as to support the upper end of the cart on a table or desk for demonstration purposes. To this end, the handle section of the cart is curved at its upper end so that the handle section will overlie the top of the desk or table with the cart in an inclined position in which the carriage will be horizontally disposed when raised to the demonstration position.

The cart is also provided with a detachable support leg which, when not in use, is clamped to the rear sides of the wheel and handle sections. When it is desired to convert the cart into a free-standing demonstration stand, the support leg is removed from its storage position and is affixed at its upper end to the handle section of the cart, the support leg also having an intermediate brace member which, when engaged with the cart adjacent the upper end of the wheel section, rigidifies and stabilizes the support leg. When the support leg is attached in its position of use, the cart can be rested on the support leg, the dimensioning of the parts being such that the cart will be inclined to a position in which the carriage section will be horizontally disposed when in its uppermost or demonstration position.

Once the business machine is secured to the carriage section, the trunk loading attachment may be utilized to load and unload the equipment from the trunk of an automobile. The trunk loading attachment includes a base plate adapted to be supported on the floor of the trunk, the base plate having a vertically extending adjustable "T" support mounted thereon which coacts with a frame extension comprising a pair of spaced apart track forming tubular frame members adapted to be connected to the uppermost end of the handle section, the carriage also being movable along the frame extension. When it is desired to deposit the equipment in the trunk, the frame extension is attached to the handle section of the cart and the cart positioned with the frame extension projection into the trunk, the frame extension having a rod adjacent its forward end which seats on the "T" support. The user then lifts the wheel section of the cart, the cart pivoting about the "T" support until the distal end of the frame extension, which is provided with small wheels, seats on the base plate. The user then disengages the frame extension from the handle section, whereupon the wheel and handle sections may be separated, along with the support leg, and the individual components stored in the trunk. The forward end of the frame extension is adapted to be lifted from the "T" support and seated on the base member, the wheels on the distal end of the frame extension facilitating such movement. When it is desired to remove the equipment from the trunk, the forward end of the frame extension is first lifted and seated on the "T" support, whereupon the handle and wheel sections of the cart are attached. The carriage is then rolled upwardly along the frame extension and onto the handle section, the cart pivoting about the "T" support until the wheels touch the ground, whereupon the carriage can be lowered to the transport position. The frame extension is then removed and returned to the trunk.

BRIEF DESCRIPTION OF THE DRAWINGS

FIG. 11 is a front elevational view with parts broken away of the basic cart with the carriage in the transport position.

FIG. 12 is a rear elevational view with parts broken away of the basic cart with the carriage in the transport position.

DETAILED DESCRIPTION

Figure 1:
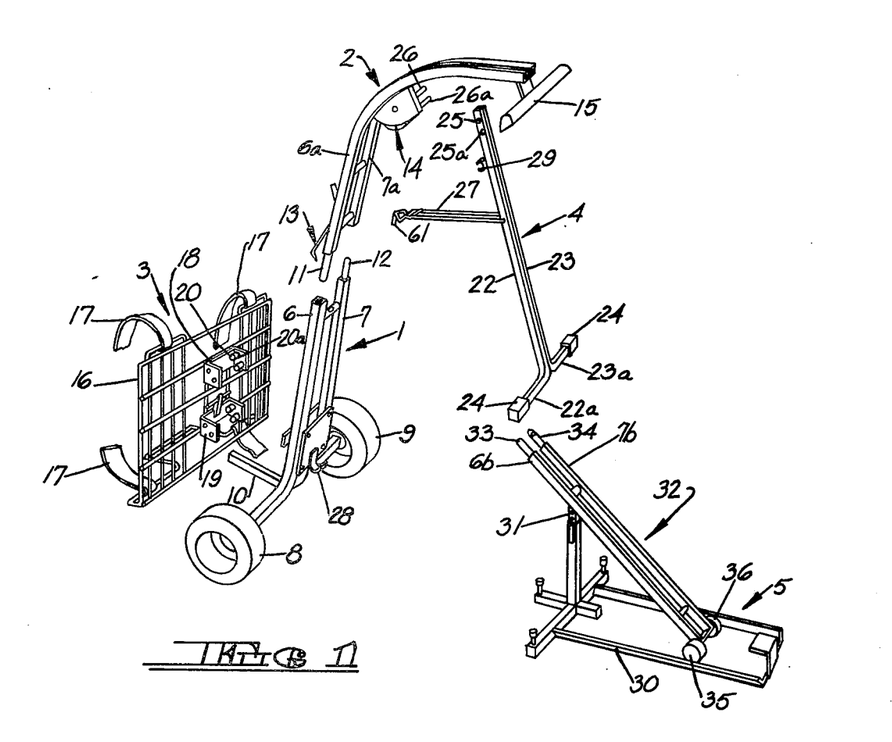
FIG. 1 is an exploded view illustrating the components of the cart, including the trunk loading attachment.

As seen in FIG. 1, the cart construction in accordance with the present invention comprises a wheel section 1, a handle section 2, and a carriage section 3, these three components when interconnected forming the basic cart. The construction additionally includes a support leg 4 and a trunk attachment 5 by means of which a piece of business equipment or the like secured to the carriage 3 may be loaded and unloaded from the trunk of an automobile or other vehicle.

In basic construction, the wheel section 1 comprises a spaced apart pair of track forming frame members 6 and 7, preferably formed from aluminum tubing which is square in cross-section, the frame members 6 and 7 flaring outwardly at their lowermost ends where they mount wheels 8 and 9 by means of which the cart may be moved from place to place. The wheel section also includes a foot 10, also formed from aluminum tubing, which coacts with the wheels 8 and 9 to support the cart in an upright position.

The handle section 2 also has a pair of track forming tubular frame members 6a and 7a adapted to extend in prolongation of the frame members 6 and 7 of the wheel section when the sections are interconnected, the sections being interconnected by means of frame pins 11 and 12 adapted to be inserted in the ends of the tubular frame members. In the embodiment illustrated, the frame pin 11 is fixedly secured to the lowermost end of frame member 6a and is adapted to be slidably received in the uppermost end of underlying frame member 6, whereas frame pin 12 is fixedly secured to frame member 7 of the wheel section and is slidably received in the lowermost end of frame member 7a of the handle section. A draw clamp 13, the details of which will be described later, serves to lock the wheel and handle sections together in assembled position. The handle section also includes spring assist mechanism, indicated generally at 14, and a handlebar 15 by means of which the cart may be pushed or pulled from place to place, the handlebar also serving as a rest by means of which the cart may be supported on the top of a desk or table. The upper ends of the track forming frame members 6a and 7a are curved, the degree of curvature being such that the uppermost end of the handle section will be essentially horizontally disposed when the cart is supported on a desk or by its support leg.

The carriage 3 comprises a platform 16 which, in the embodiment illustrated, comprises a rigid wire frame, the platform being provided with suitable attachment means, such as straps 17 by means of which a business machine or other piece of equipment to be demonstrated may be securely fastened to the platform of the carriage. On its undersurface the carriage mounts U-shaped brackets 18 and 19 having spaced apart sets of rollers 20, 20a adapted to engage opposite sides of the track forming frame members, the sets of rollers serving to maintain the carriage in engagement with the frame members while permitting it to travel lengthwise along the frame members.

The supporting leg 4 is also preferably formed from tubular aluminum stock, the leg comprising a pair of tubular members 22 and 23 joined together in side-by-side relation, with their lowermost ends turned outwardly to provide feet 22a and 23a which may be provided with protective resilient caps 24. At its uppermost end the support leg has a pair of holes 25, 25a adapted to be engaged by support leg pins 26, 26a which project laterally from one of the side plates of the spring assist mechanism 14. The support leg is provided with a brace member 27 which is pivotally connected to the support leg, the brace member being engageable with a crossbar on the handle section to secure the support leg in its position of use. When not in use, the support leg is stored against the rear sides of the wheel and handle sections, the lower end of the support leg resting on a hook 28 mounted on the wheel section with a spring clip 29 adjacent its upper end engaging a cross member on the handle section.

The trunk attachment 5 comprises a base plate 30 adapted to be seated on the floor of the trunk, the base plate mounting a vertically extending adjustable "T" support 31, the "T" support coacting with a removable frame extension, indicated generally at 32, the frame extension comprising a pair of track forming frame members 6b and 7b having frame pins 33 and 34 projecting from their leading ends by means of which the frame extension 32 is connected to the uppermost ends of frame members 6a and 7a of the handle section. At its trailing end, the frame extension is provided with small wheels 35 and 36 by means of which the frame extension may be rolled along the base plate 30 when the frame extension is removed from the "T" support.

Figures 2, 3:
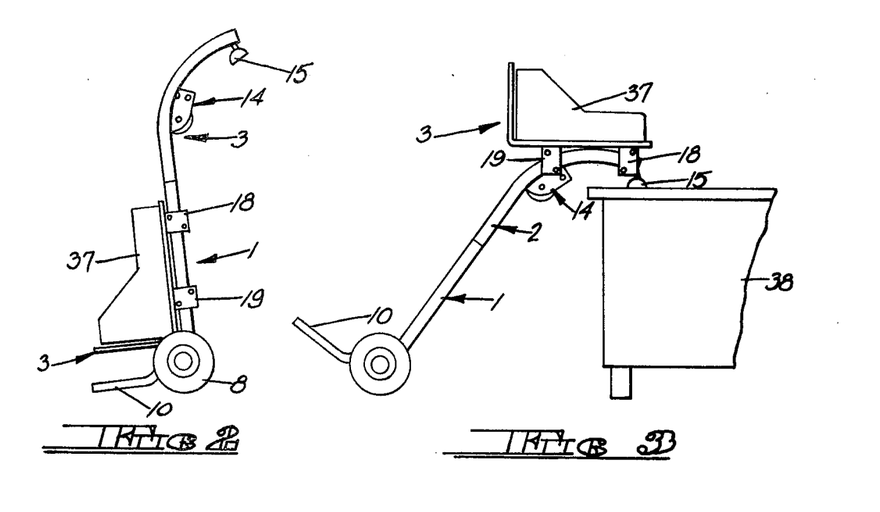
FIG. 2 is a somewhat diagrammatic side elevational view illustrating the basic cart with the carriage in the transport position.
FIG. 3 is a side elevational view illustrating the basic cart supported on a desk with the carriage in the demonstration position.
Figure 2:
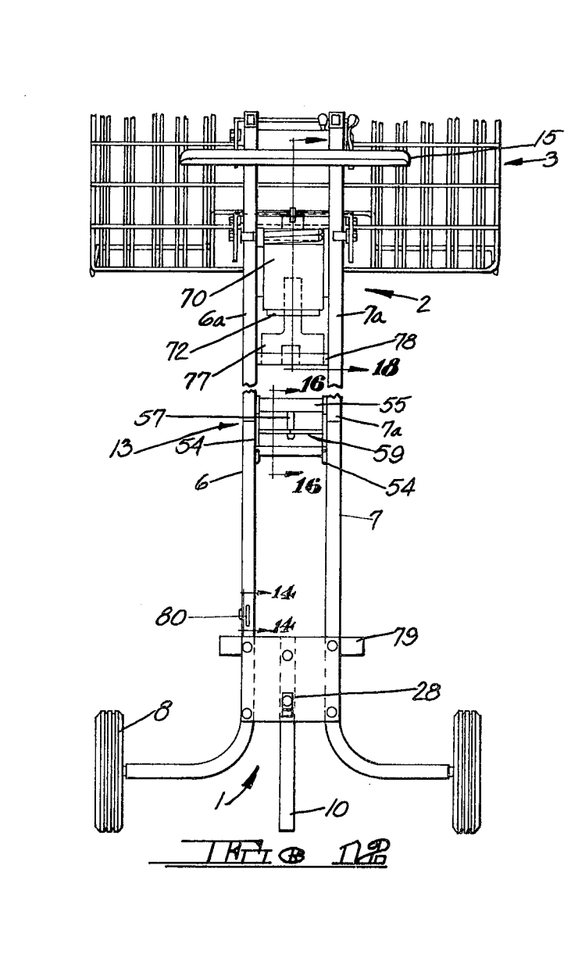

With the foregoing general organization of the components in mind, reference is next made to FIG. 2 of the drawings which diagrammatically illustrates the wheel, handle and carriage in assembled position with a business machine 37 mounted on the carriage 3. The carriage is in its lowermost or transport position, which is the position in which the business machine is moved from place to place, the user tilting the cart so that it may be rolled on its wheels.

Figure 4:
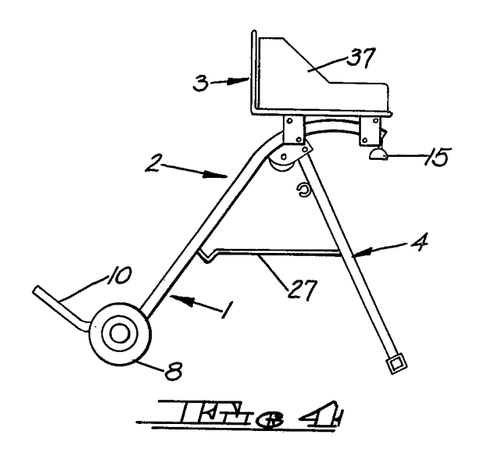
FIG. 4 is a side elevational view of the basic cart with the support leg attached to form a free-standing demonstration stand.

FIG. 3 illustrates the cart as it would be supported by a desk or table 38 for demonstration purposes, or for removal of the business machine 37 to rest on the top of the desk 38. In this position, the cart is supported on the desk by the handlebar 15 which preferably will be provided at least on its undersurface with a resilient gripping material so that it will not slide along the desk top. The carriage is in its uppermost or demonstration position, the carriage having been moved upwardly along the track forming frame members until it has assumed a horizontally disposed position due to the curvature of the upper end of the handle section. Where a desk or table is not available, the support leg 4 may be attached to the cart to form a free-standing demonstration stand, as illustrated in FIG. 4, which also illustrates the carriage in its uppermost or demonstration position. It will be understood that the support leg 4 will be removed from its storage position and attached in its position of use, thereby providing a freestanding demonstration stand.

Figure 5:
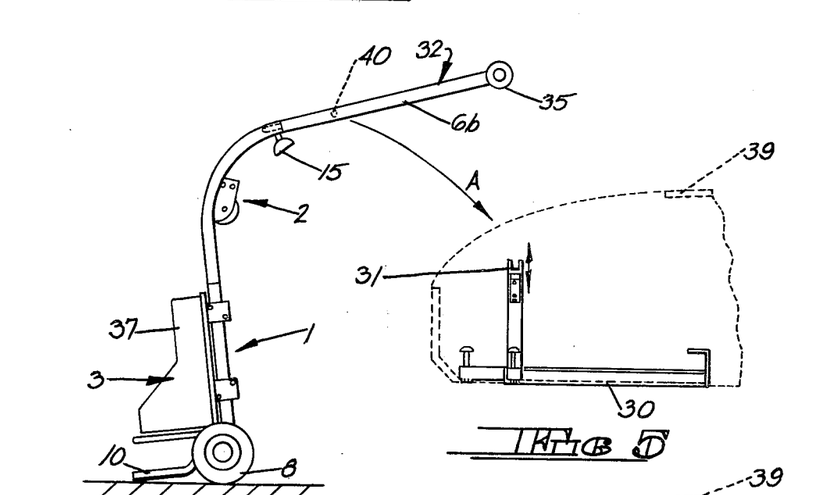
FIG. 5 is a side elevational view showing the basic cart with the frame extension of the trunk attachment connected to the handle section, the view also showing the positioning of the base plate in the trunk of an automobile, the trunk being indicated in dotted lines.
Figure 6:
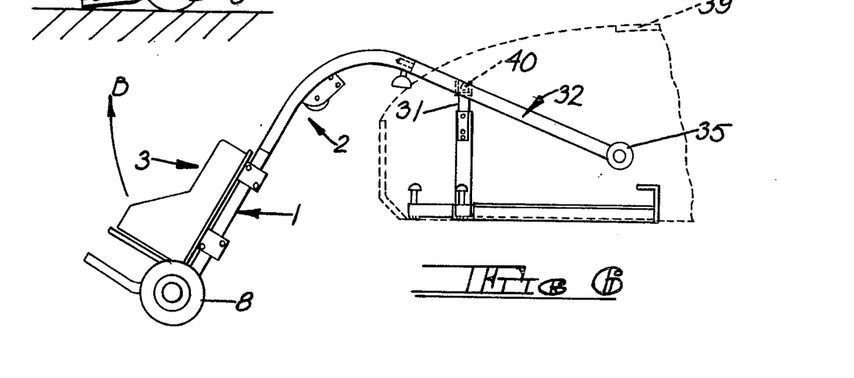
FIGS. 6 through 8 are side elevational views similar to FIG. 5 illustrating successive steps in the loading of the equipment into the trunk of the automobile.

When it is desired to load the business machine 37 into the trunk of an automobile, the frame extension 32 is first attached to the handle section in the manner illustrated in FIG. 5 while the cart is in an upright position with the carriage in its transport position. The base plate 30 of the trunk attachment is positioned on the floor of the vehicle's trunk, which is indicated by dotted lines at 39, with the "T" support 31 projecting upwardly from the base plate. The "T" support 31, which is adjustable vertically, will be positioned so that the cart may be tilted in the direction of the arrow A, seen in FIG. 5, until the support rod 40, which extends between the track forming frame members 6b and 7b of the frame extension 32, seats on the "T" support 31, which preferably is in the form of an upwardly opening channel-shaped member, the parts thereby assuming the position illustrated in FIG. 6. The cart is then caused to pivot in a counterclockwise direction about the "T" support 31 by lifting the wheel section upwardly, as indicated by the arrow B in FIG. 6, which pivoting movement may be accompanied by moving the carriage 3 upwardly along the wheel and handle sections in the manner illustrated by the arrows C in FIG. 7, the carriage advancing along the track forming frame members 6, 7; 6a, 7a; and 6b, 7b until the carriage reaches the position shown in solid lines in FIG. 7, the carriage being supported by the frame extension 32 which, in turn, is supported by the "T" support 31. As will be evident from FIG. 7, the wheels of the wheel section 1 will be lifted from the ground and the small wheels 35, 36 at the trailing end of the frame extension 32 will have seated on the base plate 30 of the trunk attachment. The cart is then disconnected from the frame extension, as by disconnecting the handle section from the frame extension 32, whereupon the wheel section 1, handle section 2 and support leg 4 may be separated from each other and the separated components stored in the trunk adjacent the trunk attachment. Upon detachment of the cart from the frame extension 32, the forward end of the frame extension will be lifted from the "T" support 31 and lowered to the position illustrated in FIG. 8 in which the frame extension seats on the base plate 30, such movement being facilitated by the small wheels 35, 36 which will roll along the base plate until the frame extension contacts the stop 41 projecting upwardly from the base plate. The carriage and the business machine carried thereon is thus stored in the trunk with essentially minimal lifting effort on the part of the user, and all of the components of the cart may be conveniently stored in the trunk where they will be readily available when it is desired to remove the business machine.

Figure 7:
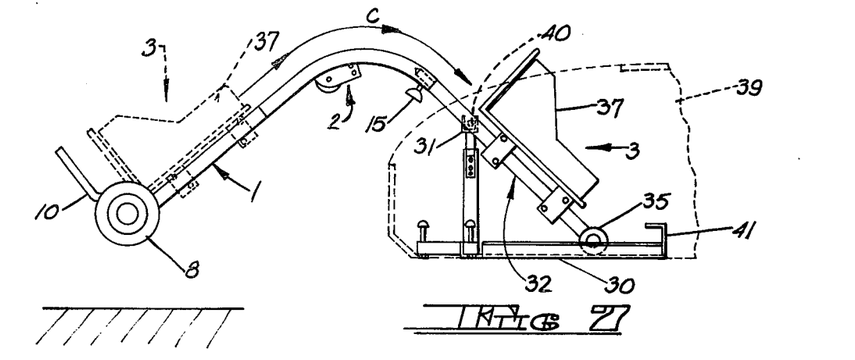
Figure 8:
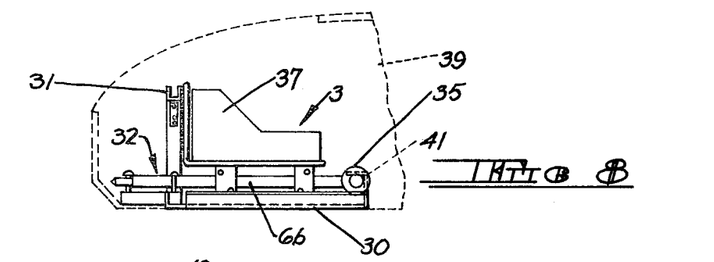

The removal of the business machine from the trunk is essentially the reverse of the procedure employed to place the equipment in the trunk, the user first lifting the leading end of the frame extension 32 until it rests on the "T" support in the position illustrated in FIG. 7, whereupon the wheel and handle sections are connected to each other and to the frame extension 32. The carriage is then rolled upwardly along the frame extension and, as it passes beyond the "T" support 31, the weight load will shift to the opposite side of the "T" support and consequently the cart will pivot in a counterclockwise direction (as seen in FIG. 7) thereby causing the wheel section 1 to contact the ground whereupon the carriage may be lowered to the transport position and the cart seated on its foot 10 in the upright position. The user then detaches the frame extension 32 and returns it to the trunk.

Figures 9, 10:
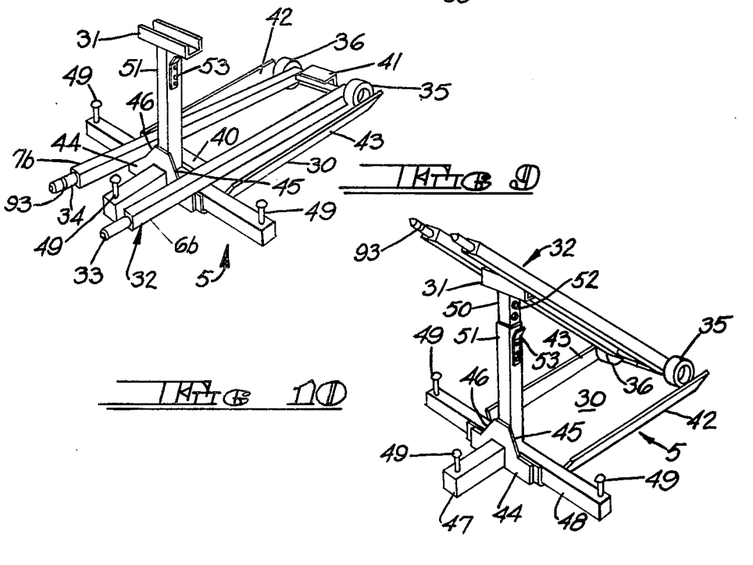
FIG. 9 is a perspective view of the trunk attachment with the frame extension in its lowermost position.
FIG. 10 is a perspective view similar to FIG. 9 illustrating the trunk attachment with the frame extension supported on the "T" support of the base plate.

With the foregoing general description of the operation of the cart in mind, reference is next made to the remaining figures of the drawings which illustrate details of the construction of the various components, including latching and locking mechanisms, safety features, and the spring assist means which facilitates movement of the loaded carriage to and from its transport and demonstration positions. The trunk attachment is shown in FIGS. 9 and 10 wherein it will be seen that the base plate 30 has flanged sides 42 and 43 which serve to retain and guide the frame extension 32 as it is raised and lowered relative to the "T" support 31. Positioning of the frame extension on the base plate is also facilitated by the guide 44 having inclined guide surfaces 45 and 46 which engage and center the frame members 6b and 7b as the frame extension is lowered onto the base plate. At its leading end the base plate is provided with a longitudinal stabilizing bar 47 and a lateral stabilizing bar 48 provided with adjustable feet 49 in the form of threaded screws which may be raised and lowered to accommodate the base plate to the contour of the trunk floor. The "T" support 31 includes a pair of telescoping tubular members 50 and 51 by means of which the height of the "T" support may be adjusted, the inner tubular member 50 having a plurality of openings 52 adapted to be selectively engaged by a detent (not shown) forming a part of the spring latch 53 which permits the "T" support to be adjusted vertically to a position in which it may be readily engaged by the supporting rod 40 of the frame extension 38 when the cart is in the position illustrated in FIG. 6.

Figures 13, 14, 15, 16:
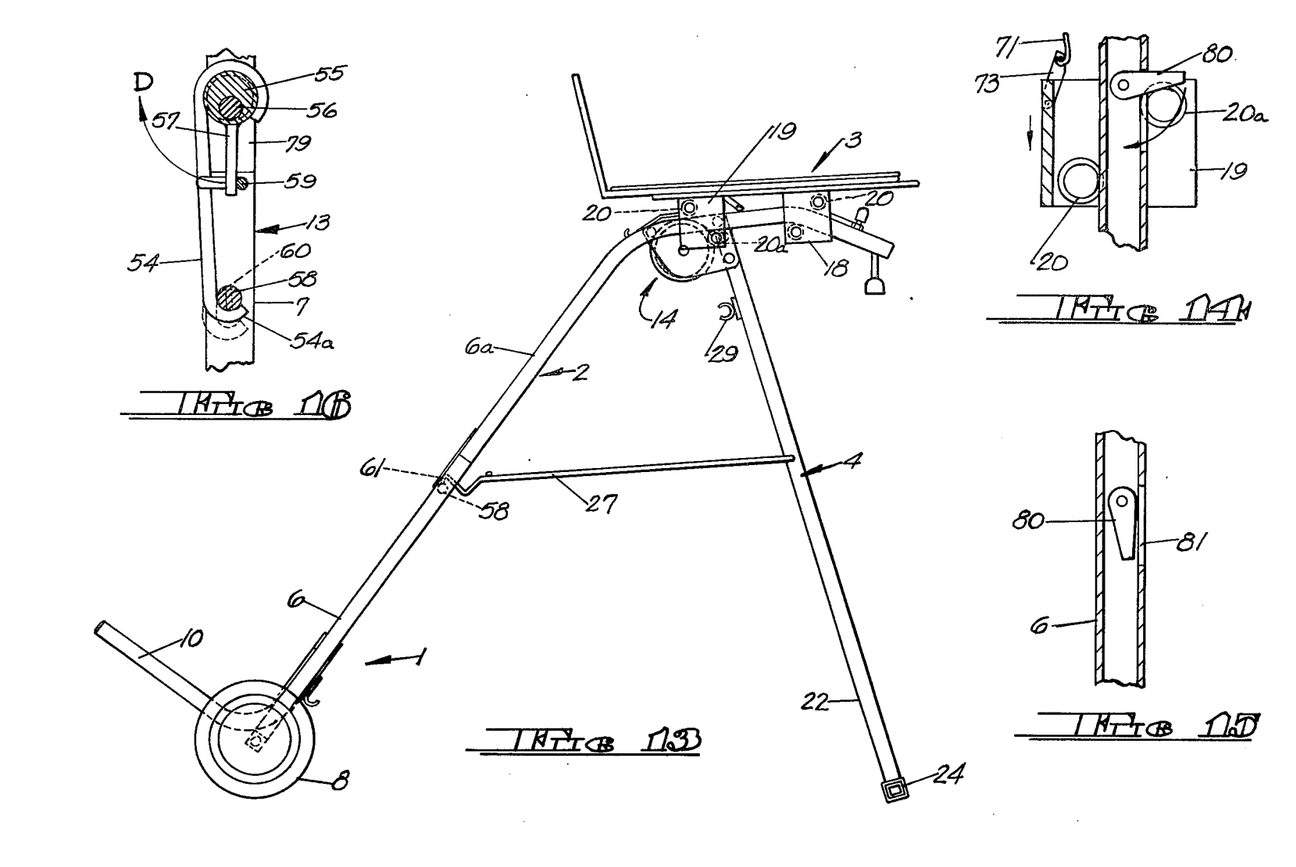
FIG. 13 is a side elevational view of the basic cart with the support leg attached in its position of use.
FIG. 14 is an enlarged vertical sectional view taken along the line 14—14 of FIG. 12 illustrating the gravity safety latch by means of which the carriage is releasably locked in the transport position.
FIG. 15 is a vertical sectional view similar to FIG. 14 illustrating the gravity safety latch in its retracted position.
FIG. 16 is an enlarged vertical sectional view taken along the line 16—16 of FIG. 12 illustrating the latch member by means of which the wheel and handle sections are secured together when assembled.

The draw clamp 13 by means of which the handle section 2 is secured to the wheel section 1 is seen in FIGS. 12 and 16, the draw clamp having a pair of hook members 54 pivotally connected at their uppermost ends to a shaft 55 which is eccentrically mounted for rotation about a rod 56 extending between the track forming frame members 6a and 7a adjacent the lowermost end of the handle section 2. The shaft 55 is adapted to be rotated by means of a handle 57 which when rotated to the position illustrated in FIG. 16 serves to cam the lowermost hooked ends 54a of the hook members into engagement with a latch rod 58 extending between the track forming frame members 6 and 7 of the wheel section adjacent its uppermost end. A V-shaped stop member 59 extends between the hook members 54, the V-shaped stop providing a seat for the handle 57 when rotated to the latched position illustrated in FIG. 16, in which position the hooked ends 54a engage about latch rod 54, thereby locking together wheel section 1 and handle section 2. When it is desired to disconnect sections 1 and 2, the handle 57 is rotated in the direction of the arrow D seen in FIG. 16, such movement causing the eccentrically mounted shaft 55 to rotate about rod 56 so as to displace the hook members downwardly to the position illustrated in dotted lines, thereby releasing the hooked ends 54a from engagement with the latch rod 58, whereupon the hook members may be rotated about the shaft 55 in a clockwise direction, thereby releasing sections 1 and 2 so that they may be separated. When it is desired to reassemble sections 1 and 2, they are fitted together by inserting the frame pins 11 and 12 into the corresponding ends of frame members 6 and 7a, respectively, as will be evident from FIG. 1, whereupon the hook members 54 will be pivoted to the dotted line position illustrated in FIG. 16 and shaft 55 rotated by handle 57 until it seats against V-shaped stop 59, the rotation of the shaft 55 causing the hooked ends 54a to be drawn into clamping engagement with latch rod 58.

As also will be seen in FIG. 16, the latch rod 58 has a bore 60 which, as seen in FIG. 13, is engaged by a projection 61 on the forward end of leg brace 27, the projection when engaged in the bore serving to attach the brace to the cart when the support leg is in its position of use.

Figures 18, 19:
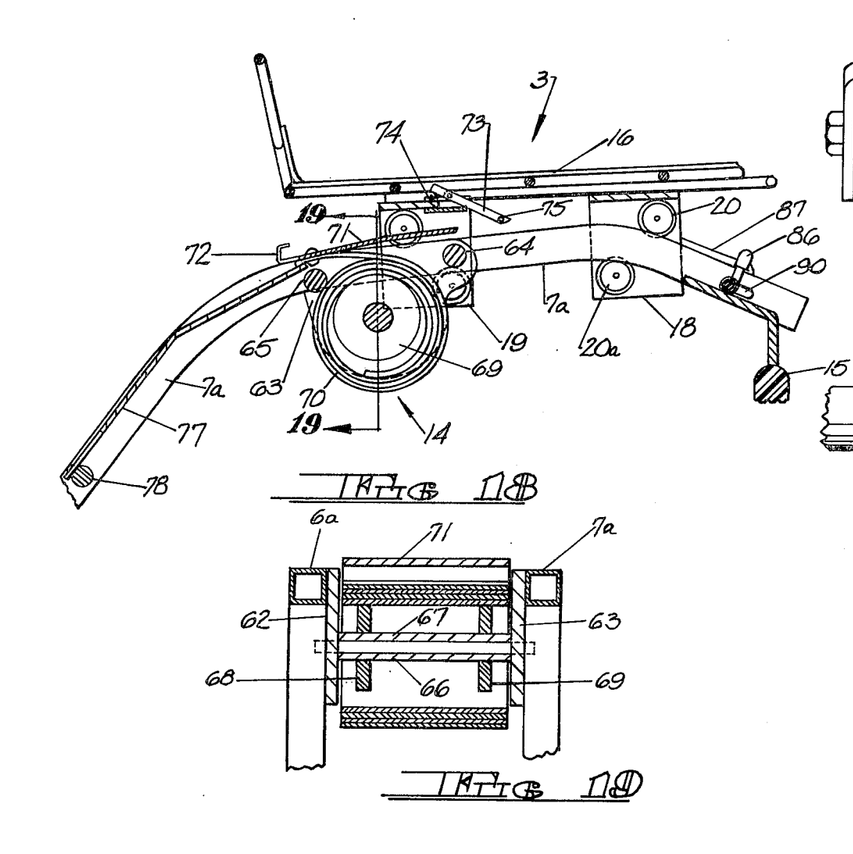
FIG. 18 is an enlarged fragmentary sectional view taken along the line 18—18 of FIG. 12 illustrating details of the spring assist mechanism and the manner in which it is automatically attached to the carriage as an incident of the movement of the carriage from the demonstration position.
FIG. 19 is an enlarged fragmentary sectional view taken along the line 19—19 of FIG. 18.

An important feature of the invention is the spring assist means 14 which counterbalances the weight of the business machine carried by the carriage as the carriage is moved from the demonstration position to the transport position and returned. As best seen in FIGS. 18 and 19, the spring assist mechanism comprises a pair of side plates 62 and 63 depending from the inner surfaces of the track forming frame members 6a and 7a, respectively, the side plates being secured to the frame members by means of anchor rods 64 and 65. A shaft 66 extends between the side plates, the shaft 66 rotatably mounted a spool 67 having cylindrical discs 68 and 69 adjacent its opposite ends, which discs support the spiral spring 70 which is coiled around the discs of the spool. The outermost end of the spring is secured to a spring plate 71 having a U-shaped channel 72 at its outermost end. This channel is adapted to be engaged by a latch arm 73 pivotally connected to the U-shaped bracket 19 forming a part of the carriage 3, the latch arm being biased in the direction of spring plate 71 by a spring 74. As the carriage is moved from the demonstration position toward the transport position, the spring biased latch arm will contact and ride over the spring plate 71, the spring plate serving to guide the lowermost end of the latch arm into contact with the U-shaped channel 72, the latch arm carrying a cross pin 75 at its lowermost end which engages the channel 72, the channel 72 having a medial slot 76 therein (seen in FIG. 11), which permits the latch arm to pass beyond the channel until the cross pin at the end of the latch arm engages the channel. In order to insure that the spring plate and its U-shaped channel are in proper position to be engaged by the latch arm, a spring metal tongue 77 is positioned to contact the undersurface of the spring plate 71 adjacent the U-shaped channel 72. The tongue, which is secured to a cross member 78 extending between the opposing frame members 6a and 7a, additionally serves as a guide for the spring plate 71 and the spiral spring 70 as the spring is unwound by continued movement of the carriage toward the transport position.

The tension of the spiral spring will be chosen so that, as it is unwound, it will effectively counterbalance the weight of the business machine secured to the carriage 3. Preferably, however, the tension will be such that the carriage, when loaded, will travel to the transport position and will remain in the transport position, the weight of the loaded carriage being sufficient to maintain the spring in the extended or unwound condition. To this end, a stop 79, as best seen in FIGS. 11 and 12, is provided adjacent the lower end of the wheel section 1, the stop being positioned to be contacted by the leading edge of the bracket 19 on carriage 3 when the carriage reaches the transport position. While the spring 70 remains extended by reason of the weight load on the carriage, only a relatively minimal lifting force is required to move the carriage upwardly from the transport position for return to the demonstration position. It has been found that latch means are not normally required to maintain the loaded carriage in the transport position, although latch means may be provided for such purpose if desired. However, it is preferred to provide a safety latch to prevent movement of the carriage from the transport position in the event the cart is tilted into an essentially horizontal position, as where the cart would be tilted so that its handle 15 rests on the ground. When the carriage is in this position, the force of gravity tending to hold the carriage in the transport position becomes quite small, and in order to prevent unwanted movement of the carriage along the track forming frame members, a gravity latch 80 (seen in FIGS. 14 and 15) is provided in one of the frame members, such as the frame member 6, the latch being pivotally connected to the frame member so that, if the frame member is inclined to an essentially horizontal position, the latch will pivot outwardly through the slot 81 to form a stop engagable by the small wheel 20a mounted on bracket 19. The latch 80 is positioned to be engaged by the wheel 20a if the carriage moves a short distance from its lowermost position in which it is seated against the stop 79, as will be apparent from FIG. 12. With this arrangement, the gravity latch 80 will remain in its extended position, being held by the wheel 20a, even when the cart is returned to its upright position. The latch can be readily released, however, by pressing downwardly on the carriage until it seats on the stop 79, the spacing of the parts being sufficient to release the latch arm so that it will pivot to its inoperative position.

Figure 17:
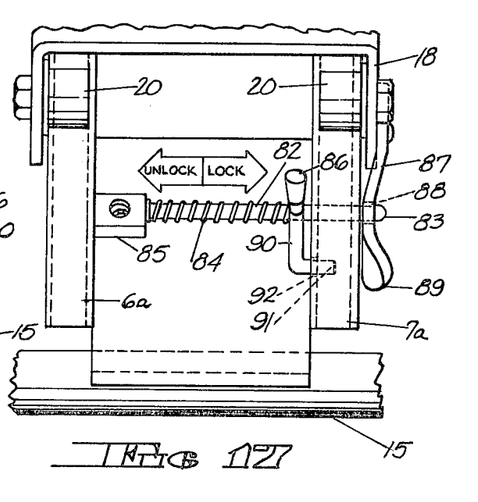
FIG. 17 is an enlarged fragmentary plan view illustrating the locking mechanism for securing the carriage in the demonstration position, the locking mechanism also serving to lock the frame extension of the truck attachment to the handle section.

It is desirable, however, to have a positive locking means to secure the carriage in its uppermost demonstration position. Such locking means, as best seen in FIG. 17, comprises an axially movable stop pin adapted to extend through frame member 7a with its end 83 projecting outwardly beyond the side edge of the frame member, the stop pin being normally biased to this position by means of a spring 84 surrounding the stop pin and extending between the mounting block 85 and a small handle 86 projecting from the stop pin adjacent the frame member 7a. The projecting end 83 of the stop pin is positioned to be engaged by an arm 87 projecting from the bracket 18 of carriage 3, the arm having an opening 88 adapted to be engaged by the extending end 83 of the stop pin. The leading end 89 of the arm 87 is contoured to define a cam surface which will contact the end 83 of the stop pin and displace the stop pin inwardly against the compression of spring 84, the arm holding the stop pin in displaced position until the slot 88 is aligned with the pin, whereupon the stop pin will enter the slot and hence lock the carriage in place. The carriage may be released by displacing the stop pin inwardly by means of the handle 86.

In addition to automatically locking the carriage in the demonstration position, the locking mechanism is also utilized to lock the frame extension 32 to the frame members of the handle section when the trunk attachment is being used. For this purpose, the stop pin 84 is provided with an extension 90 having an angularly disposed end portion 91 which projects through an opening 92 in the inner well surface of frame member 7a so as to lie within the confines of the tubular frame member. Axial displacement of the stop pin 82 in the direction of spring 84 will cause the end portion 81 to move outwardly so that it clears the opening in the tubular frame member. When in this position, the frame pin 34 of frame extension 32 may be inserted into frame member 7a and, as seen in FIG. 10, the frame pin 34 is provided with an annular groove 93 which, when the parts are fully assembled, lies in alignment with the end portion 91 of the stop pin extension. Upon release of the handle 86, the end portion 91 of the stop pin extension will engage the groove 93 and hence lock the frame extension to the handle section.

As should now be apparent, the present invention provides a versatile cart construction which may be utilized to transport and demonstrate various types of business machines and other types of equipment which would be difficult to carry due to their weight. While a preferred embodiment of the invention has been described and illustrated, it is to be understood that modifications may be made in the invention without departing from its spirit and purpose.

What is claimed is:

1. A cart for transporting and demonstrating business machines and the like comprising an elongated track defining tubular frame having an essentially planar lower portion and a curved upper portion, wheel at the lowermost end of said lower portion, a carriage for a business machine mounted on said frame for movement from a lowermost transport position in which the carriage lies adjacent said wheels to an uppermost demonstration portion in which the carriage lies adjacent the uppermost end of said frame, means for positioning said frame in an inclined position in which the carriage will be horizontally disposed when in its uppermost demonstration position, and spring assist means mounted on the upper portion of said frame, said spring assist means comprises a spiral spring adapted to be unwound as the carriage is moved from the demonstration position of the transport position, and latch means for connecting the outermost end of said spiral spring to said carriage as said carriage is moved from its uppermost demonstration position to its lowermost transport position and for disconnecting said spiral spring when the carriage is returned to its uppermost demonstration position.

2. The cart construction claimed in claim 1 wherein the latch means for connecting said spiral spring to said carriage comprises a latch arm mounted on said carriage and latch arm engaging means mounted on the outermost end of said spiral spring, said latch arm engaging means being positioned to engage said latch arm as said carriage commences movement from the uppermost demonstration position toward the lowermost transport position and to release said latch arm as the carriage reapproaches its uppermost demonstration position.

3. The cart construction claimed in claim 2 wherein said latch arm engaging means comprises an elongated spring plate having a U-shaped channel at one end, and wherein said latch arm is spring biased in the direction of said spring plate and mounts a cross pin engagable in said U-shaped channel as the carriage commences movement toward the transport position.

4. The cart construction claimed in claim 3 including locking means for releasably securing said carriage in the demonstration position.

5. The cart construction claimed in claim 4 including safety latch means on the lowermost portion of said frame for releasably securing said carriage in its lowermost transport position.

6. The cart construction claimed in claim 1 wherein said frame is defined by a spaced apart pair of tubular frame members connected together in parallel relation to define a track, said carriage being movably mounted on said frame members by sets of rollers engaging opposite sides of each of said frame members.

7. The cart construction claimed in claim 6 wherein the upper and lower portions of said frame comprise separate frame sections, including clamping means for detachably securing the sections together.

8. The cart construction claimed in claim 1 wherein the means for positioning the frame in an inclined position comprises a support leg having means for detachably connecting said support leg to said frame in a frame supporting position.

9. The cart construction claimed in claim 8 including means for detachably connecting said support leg to said frame in a storage position in which said support leg lies along and is clamped to said frame.

10. The cart construction claimed in claim 1 wherein the means for positioning the frame in an inclined position comprises a handlebar depending from the upper portion of said frame, said handlebar being adapted to seat on the top of a desk or like support.

11. The cart construction claimed in claim 1 in combination with a frame extension adapted to be detachably connected to the uppermost end of said frame, a base member adapted to be supported on the floor of an automobile trunk, an adjustable support projecting upwardly from said base member, menas on said adjustable support for engaging said frame extension, said carriage being movable along said frame extension to deposit the carriage in the automobile trunk.

12. The cart construction claimed in claim 11 wherein said adjustable support comprises a "T" support havan upwardly opening channel, and wherein said frame extension has a pivot rod adapted to be received in said channel, whereby said frame extension may be pivoted about said "T" support.

13. The cart construction claimed in claim 12 wherein said frame extension has rollers at its rearmost end, said rollers being adapted to seat on said base member, stop means for said frame extension at the rearmost end of said base member, said stop means being engagable by said frame extension when said frame extension is removed from said "T" support and lowered onto said base member.

14. In combination in a cart for transporting and demonstrating business machines and the like:
- a wheel section comprising a frame having a pair of spaced apart parallel tubular frame members defining a track, wheels at the lowermost end of said wheel section, and a foot angularly disposed with respect to said wheels to support said wheel section in an upright position;
- a handle section comprising a frame having a pair of spaced apart parallel tubular frame members defining a track, means for detachably connecting said handle section to said wheel section with the track forming frame members of said handle section extending in prolongation of the track forming frame members of said wheel section, the upper end of said handle section being curved, and a handlebar attached to the uppermost end of said wheel section;
- a carriage, roller means on said carriage mounting said carriage for movement along the track defining frame members of said wheel and handle sections, said carriage being movable from a transport position in which it lies adjacent the lowermost end of said wheel section to a demonstration position in which it lies adjacent the uppermost end of said handle section;
- spring assist means mounted on said handle section, said spring assist means comprising a spiral spring, means operatively connecting the outermost end of said spiral spring to said carriage, whereby said spiral spring will be unwound as the carriage moves from the demonstration position to the transport position and will rewind as the carriage moves from the transport position to the demonstration position; and
- a trunk loading means, said trunk loading means comprising a frame extension, said frame extension comprising a pair of spaced apart parallel tubular frame members defining a track, means for detachably connecting said frame extension to the uppermost end of said handle section with the track forming frame members of said frame extension in prolongation of the track forming frame members of said handle section, a base member adapted to be placed on the floor of an automobile trunk, an adjustable support projecting upwardly from said base member, and means for pivotally supporting said frame extension on said support, whereby said carriage may be moved along said frame extension and deposited on said base member.

15. The cart construction claimed in claim 14 including a support leg, means for detachably securing said support leg to said wheel and handle sections in a storage position, and means for detachably connecting said support leg to said wheel and leg sections in an operative position in which said wheel and frame sections are supported in a free-standing inclined position by said support leg.

* * * * *